United States Patent [19]

Morrison et al.

[11] 4,303,338

[45] Dec. 1, 1981

[54] WHEEL ALIGNMENT METHOD AND APPARATUS

[75] Inventors: Leonard A. Morrison, Chicago; Robert S. Hampton, Waukegan; Craig E. Mountz, Wadsworth; John W. Murphy; Phillip A. Spainhour, both of Waukegan, all of Ill.

[73] Assignee: Ammco Tools, Inc., North Chicago, Ill.

[21] Appl. No.: 71,950

[22] Filed: Sep. 4, 1979

[51] Int. Cl.³ ............................................ G01B 11/275
[52] U.S. Cl. ................................. 356/155; 33/203.18; 33/288
[58] Field of Search ............. 356/155; 33/288, 203.18, 33/203.19, 203.2

[56] References Cited

U.S. PATENT DOCUMENTS

| | | | |
|---|---|---|---|
| 2,249,226 | 7/1941 | Peters | 33/203.18 |
| 3,164,910 | 1/1965 | Manlove | 33/203.18 |
| 3,758,958 | 9/1973 | Jordon | 33/203.18 |
| 3,953,134 | 4/1976 | Appel et al. | 356/155 |
| 4,106,208 | 8/1978 | Hunter | 33/203.18 |

Primary Examiner—Richard A. Rosenberger
Attorney, Agent, or Firm—Edmond T. Patnaude

[57] ABSTRACT

There is described an instrument and method for adjusting toe relative to the tracking axis of the vehicle by initially measuring the toe angles of the two front or rear wheels relative to the planes of the other two wheels on the same respective sides of the vehicle, and then adjusting the toe angles by one-half the difference between the initially measured angles.

4 Claims, 9 Drawing Figures

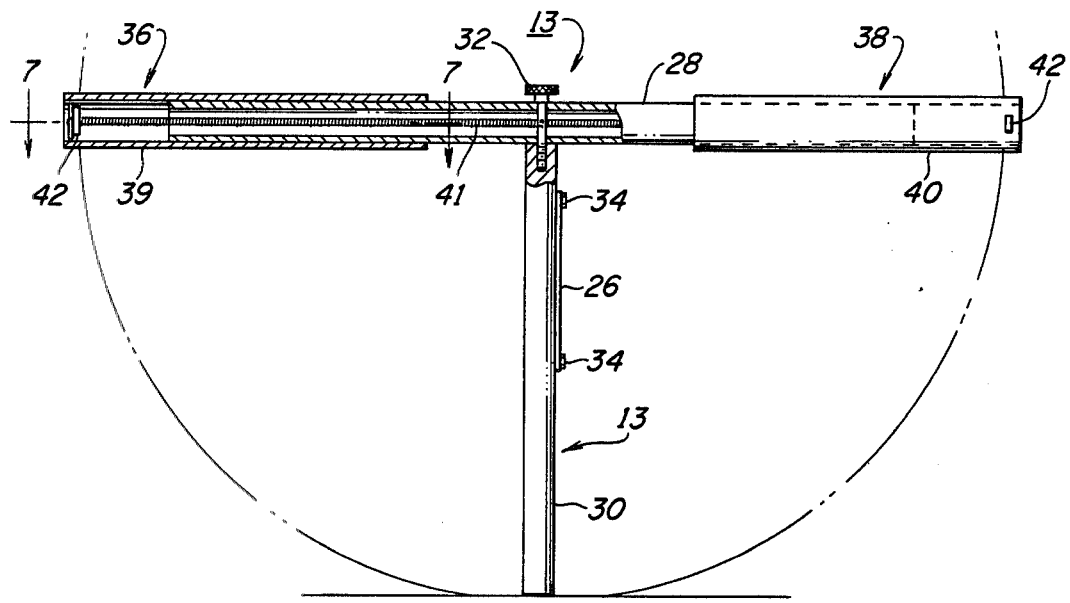
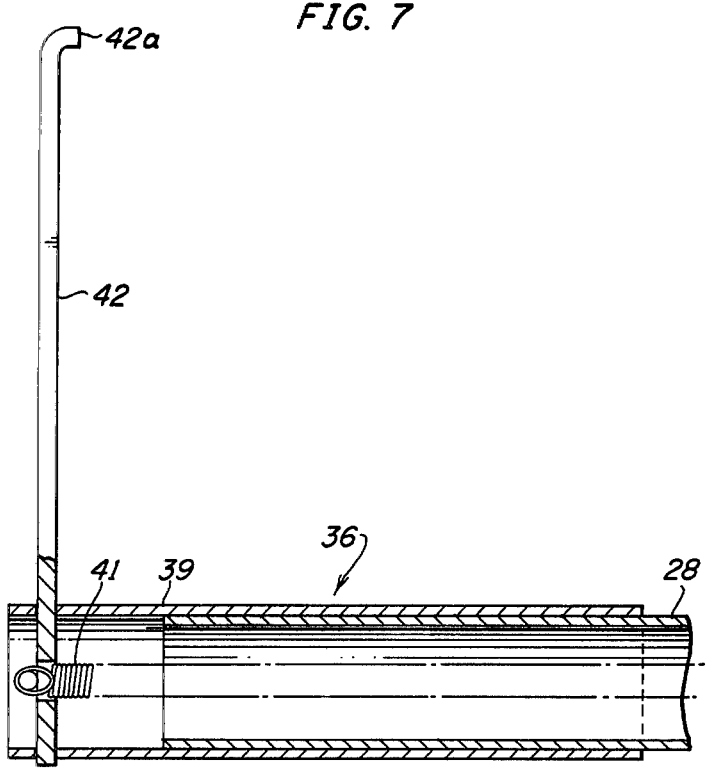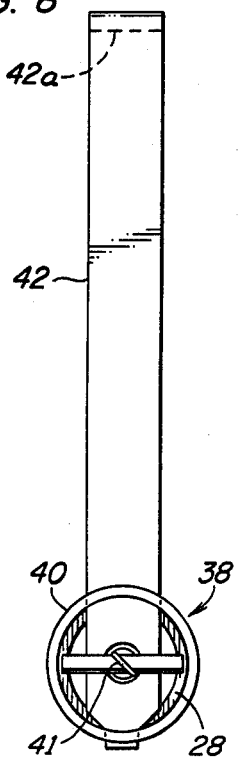

WHEEL ALIGNMENT METHOD AND APPARATUS

The present invention relates in general to the art of aligning the wheels of an automative vehicle, and it relates in particular to a new and improved method and apparatus for use in setting the toe angles relative to the tracking axis of the vehicle.

BACKGROUND OF THE INVENTION

In U.S. Pat. No. 3,953,134, which is assigned to the assignee of the present invention, there is described an optical wheel alignment instrument which may be used for measuring the toe angles of the wheels of a vehicle. When using that patented instrument to align the front wheels of a vehicle, the steering wheel is preferably locked in the straight ahead position, and the toe angles of the two front wheels are then measured and set relative to one another and to the central longitudinal axis of the vehicle. If one of the front wheels is either forward or rearward of the other, a condition known in the art as set-back, when the vehicle is later driven straight ahead, the steering wheel will be at an angle. This same result may also occur if the thrust axis of the vehicle is not parallel to the central longitudinal axis of the vehicle.

When using prior art methods of wheel alignment, the vehicle should be road tested after being aligned, and if the vehicle does not track in a true straight ahead direction when the steering wheel is centered, the alignment technician should then correct the condition by making equal and opposite adjustments of the toe angles of the two wheels being aligned. The extent of such adjustments has been a matter of judgment based on the experience of the technician and is a trial and error process. Instruments have, however, been on the market for measuring the toe angles relative to the tracking axis of the vehicle, but the high cost of such instruments, the difficulty in maintaining them calibrated, and the time required to make such measurements have limited their use. Consequently, the trial and error readjustment of the toe angles following a road test of the vehicle remains the most common method of adjusting toe to correct for wheel set-back.

SUMMARY OF THE INVENTION

Briefly, there is provided in accordance with the teachings of the present invention a new and improved method of measuring the toe angles of the wheels of a vehicle relative to the tracking axis of the vehicle, and there is also provided a novel instrument which facilitates the measurement of the toe angles relative to the tracking axis.

The instrument of the present invention utilizes a pair of sighting means, which are adapted to be mounted to the wheels to be aligned, and a pair of graduated screens adapted to be mounted to the other wheels and which in combination with the sighting means indicate the toe angles of the wheels being aligned relative to the planes of the other wheels. When using the instrument in accordance with the present invention, the camber and caster of the front wheels are initially set in any known manner. Thereafter, the toe angles of the front wheels are set relative to the geometric or central longitudinal axis of the vehicle by setting the toe of each front wheel relative to the plane of the other front wheel as recommended by the manufacturer of the vehicle. Then the respective toe angles of the front wheels relative to the planes of the rear wheels of the vehicle are measured. If these latter angles are not equal, then the toe angles of the front wheels are respectively adjusted by one-half of the difference between the later measured angles. As a result, the front wheels will have the recommended toe angles relative to the tracking axis of the vehicle and the steering wheel will be in the straight ahead position when the vehicle is tracking in a straight ahead direction, unless of course, the tracking axis is not parallel to the longitudinal axis of the vehicle for reasons other wheel offset. In which case, a diagnosis and correction of the problem should be made. It may thus be seen that when the toe angles are adjusted the steering wheel will, in most cases, be accurately centered without the need for road testing of the vehicle.

Inasmuch as the method of this invention does not require the measurements of the actual toe angles relative to the thrust line or tracking axis of the vehicle, our instrument which is used for making these measurements, may be simply and quickly calibrated in the field if, for example, it should be dropped or otherwise mishandled so as to change the sight angle of the instrument.

In accordance with another aspect of the invention there is provided a novel mounting assembly for attaching the sight screen to a wheel of the vehicle. A single mounting assembly embodying this invention is adaptable to substantially all of the tire sizes and models used on pleasure vehicles and light trucks. When using this mounting assembly, the outer vertical planes of the associated tires are used as the reference planes inasmuch as they do not shift any significant amount as the inflation pressure in the tire is varied over wide limits.

GENERAL DESCRIPTION OF THE DRAWINGS

The present invention will be better understood by a reading of the following detailed description taken in connention with the accompanying drawings wherein:

FIG. 6 is an elevational view of a wheel mounted assembly embodying the invention;

FIG. 7 is an enlarged partly sectioned view of the device of FIG. 6 taken along the line 7—7; and FIG. 8 is an end view taken from the left of FIG. 7.

DETAILED DESCRIPTION OF THE INVENTION

Figure 1:
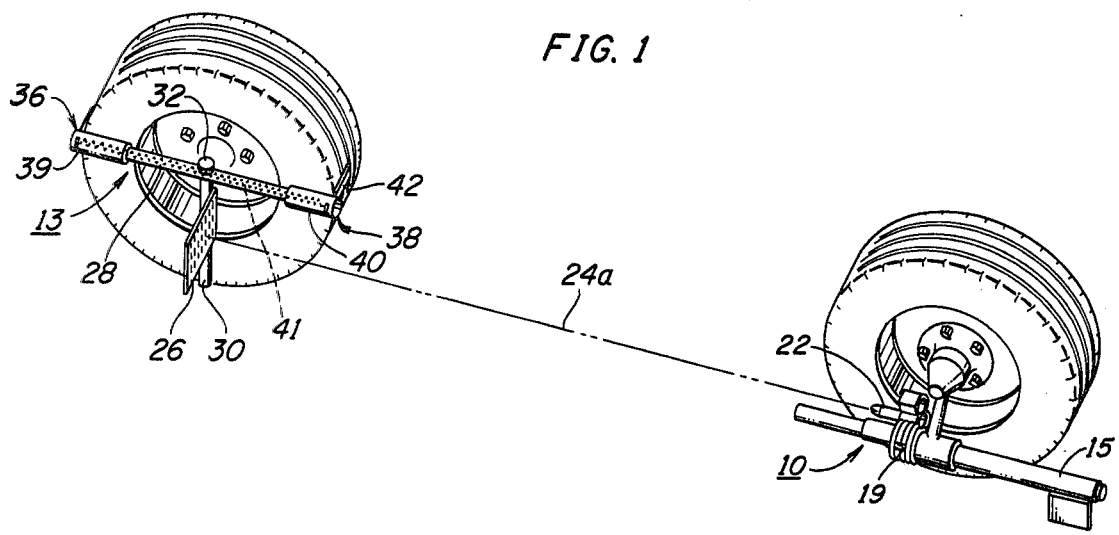
FIG. 1 is a pictorial view showing an instrument embodying the present invention mounted to a front wheel and to a rear wheel of a vehicle.
Figure 2:
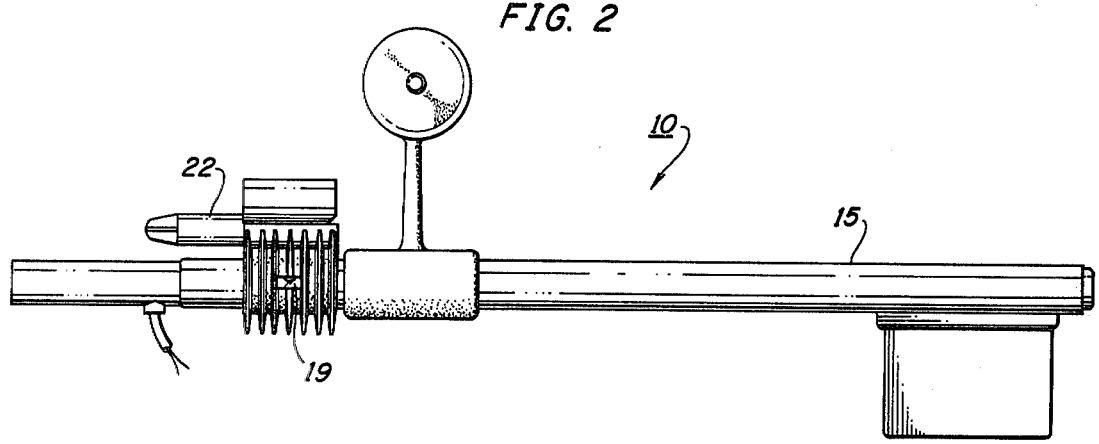
FIG. 2 is an elevational view of a wheel alignment instrument embodying the present invention.
Figure 3A:
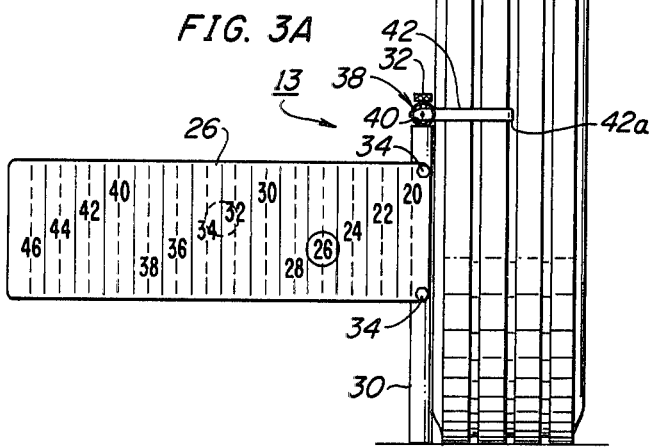
FIG. 3A is a view of the portion of the instrument mounted to the right rear wheel as shown in FIG. 1.
Figure 3B:
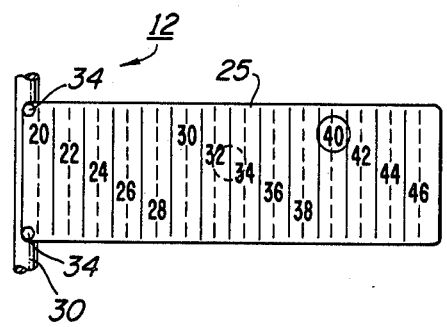
FIG. 3B is a fragmentary view of the portion of the instrument mounted to the left rear wheel of the vehicle.
Figure 4:
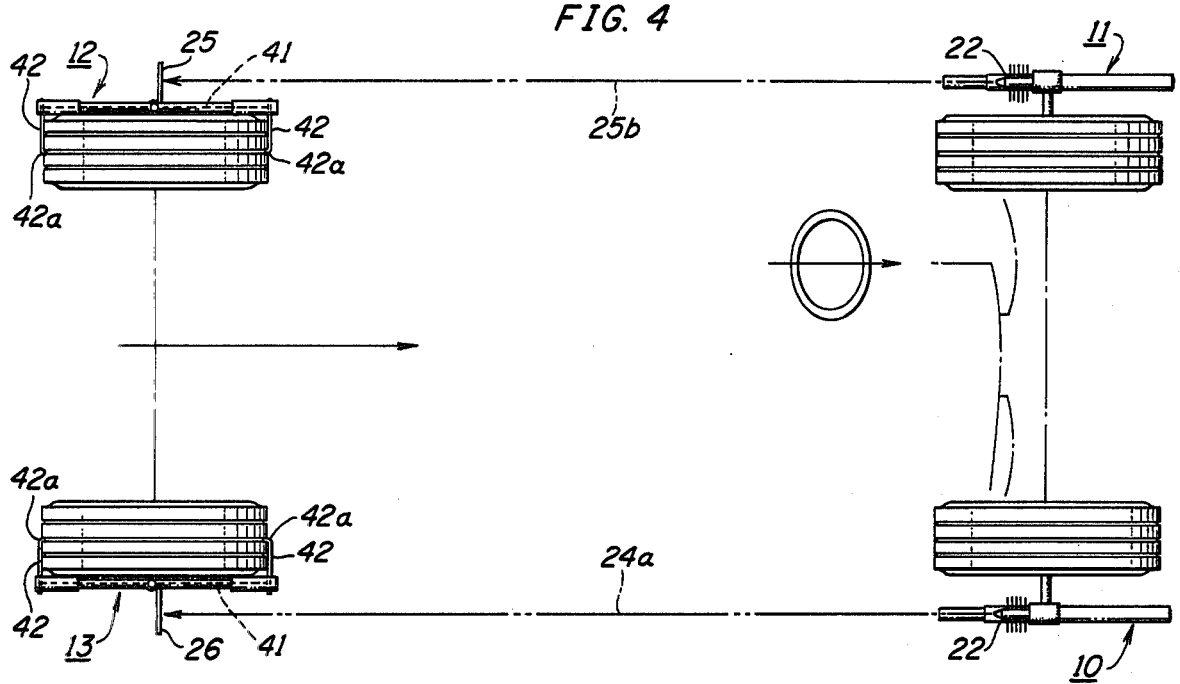
FIG. 4 is a schematic plan view of the wheels of a vehicle with the instrument of the invention in use, this view being useful in understanding the present invention.

Referring to FIGS. 1, 2, 3 and 4, a wheel alignment instrument embodying certain aspects of the present invention comprises a pair of right and left hand units 10 and 11, only unit 10 being shown in FIGS. 1 and 2, for respective attachment to the wheels to be aligned, and a second pair of right and left hand units 12 and 13 for respective attachment to the other two wheels of the vehicle. The units 10 and 11 are essentially the same as the units 10 and 11 described in U.S. Pat. No. 3,953,134 and the description thereof in the said patent is incorporated herein by reference. Briefly, however, the unit 10 is best shown in FIGS. 1 and 2 and includes a tubular body portion 15 which is adapted to be mounted in coplanar relationship with a wheel to be aligned by means of a magnetic mounting clamp 17 mounted to the hub of the wheel. A spirit level 19 lies parallel to the longitudinal axis of the body 15 and is used to position the body 15 in a true horizontal position.

A sighting device 22 is fixedly mounted to the body 15 and provides a visual sight line 24a extending horizontally and parallel to the longitudinal axis of the body 15. It may thus be seen that the sight line 24a will be horizontal and parallel to the plane of the wheel to which the unit 10 is mounted. Similarly, the sight line 24b is horizontal and parallel to the plane of the front wheel on the left or driver's side of the vehicle.

The units 12 and 13 which are mounted to the rear wheels include graduated screens 25 and 26 respectively having planar forwardly directed faces. The screen 26 lies perpendicular to the principal plane of the right rear wheel and the screen 25 lies perpendicular to the principal plane of the left rear wheel. The scales 25 and 26 are provided with equally spaced apart, vertical graduation lines labeled 20–46. For ease of reading, every other line is a solid line and the intermediate lines are dash lines.

In order to mount the screens 25 and 26 to the respective rear wheels, the present invention provides a novel wheel mount construction with the mounts for the left and right hand screens being mirror images of one another. With further reference to FIGS. 6, 7 and 8 it may be seen that the instrument 13, which is adapted for mounting to the right rear wheel includes a tubular body member 28 to which a tubular upright 30 is attached by means of a thumbscrew 32 threadedly received in a threaded opening in a plug at the top of the upright 30. The scale 26 is attached to the upright by means of a pair of machine screws 34.

A pair of arm assemblies 36 and 38 having tubular body portions 39 and 40 are telescopically fitted over the ends of the body tube 28 and are spring biased toward one another by means of a coiled tension spring 41. A plurality of arms 42 extend perpendicularly from the assemblies 36 and 38 respectively, and each arm has an inwardly turned distal end 42a (best shown in FIG. 7). The arms 42 are fixed to the parts 39 and 40 wherefore the arms can be rotated to a limited extent by rotating the parts 39 and 40 on the tube 28. This may be done so that the ends 42a do not extend into the tread grooves on the tire and thereby restrict inward adjustment of the mount on the wheel.

The inner vertical edges of the upright 30 and the tubular body member 28 are coplanar and are pressed firmly against the wall of the tire when in use. We have found that the tire walls lie substantially parallel to the running planes of the associated wheels wherefor the screens 25 and 26 lie in planes which are substantially perpendicular to the tracking axis of the wheel to which they are mounted. Over or under inflation has no appreciable affect on the readings made.

METHOD OF OPERATION

The method of the present invention may be used to set the toe angles of the adjustable wheels of a vehicle. Ordinarily, these are the two front steerable wheels, but in some vehicles the toe angles of the rear, non-steerable wheels are adjustable. Assuming that the steerable front wheels are to be aligned, the preferred practice is to measure, and if necessary, set the caster and camber of the wheels to the manufacturers specifications. Then, using for example, the gauges 10 and 11 the toe angles of the two wheels are set in the manner described in U.S. Pat. No. 3,953,134. In that procedure, the steering wheel is clamped in the straight ahead position while the toe angles are measured and adjusted.

After the toe angles have thus been adjusted to the manufacturer's specifications, the screens 25 and 26 are then mounted to the non-steerable rear tires in the manner described hereinbefore. With the steering wheel still clamped in the straight ahead position, the alignment technician observes the respective positions at which the sight lines intercept the screens 25 and 26. If there is no front wheel offset in the vehicle under test, the two sight lines will intercept the respective screens at the same place, which may be, for example, at graduation mark 35 or at any other mark. The particular mark which is intercepted by both lines of sight is of no significance insofar as this adjustment is concerned.

Assume, however, that there is appreciable front wheel set back on the vehicle under test. Consequently, the two sight lines will intercept the respective screens at different positions. By way of example only, one sight line might intercept the screen 26 at graduation line 26 and the other sight line might intercept the screen 25 at graduation line 40. The alignment technician will then add these two readings together and divide by two to arrive at the number thirty-three. He then adjusts each wheel until the respective sight lines are at the graduation line thirty-three. The toe angles of the steerable wheels will thus have been set to the manufacturer's specifications relative to the tracking axis of the vehicle, and the vehicle will travel in a straight ahead direction when the steering wheel is held in the straight ahead position.

Figure 5:
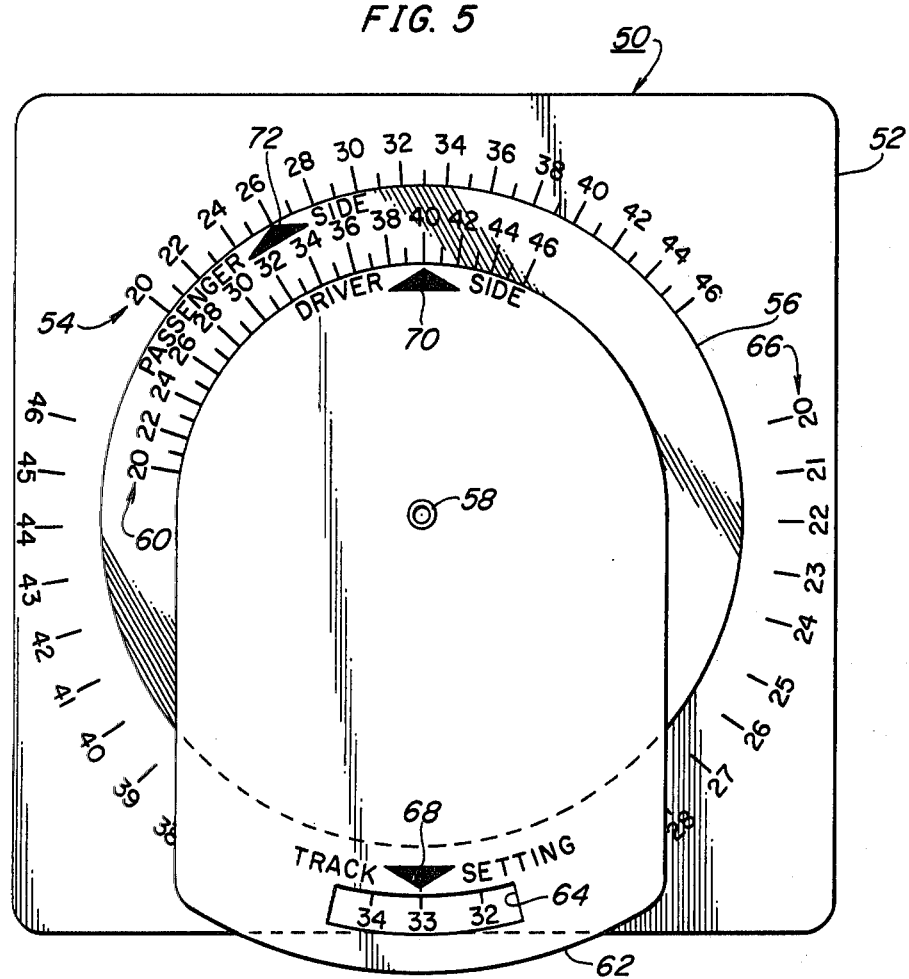
FIG. 5 is a plan view of a calculating device which facilitates the adjusting of the toe angles in accordance with the method of the present invention.

Referring to FIG. 5, there is shown a simple calculator 50 for facilitating the calculation of the positions on the screens 25 and 26 which should be intercepted by the sight lines. The calculator 50 comprises a first planar member 52 having a first set of arcuately arranged graduation lines 54 corresponding respectively to the graduation lines on the screen on the passenger side of the vehicle under test. A circular planar member 56 is rotatably mounted to the member 52 by means of an eyelet 58 and is provided with a set of arcuately arranged graduation lines 60 corresponding to the graduation lines on the screen on the driver's side of the vehicle under test. A third planar member 62 is rotatably mounted by the eyelet 58 over the member 60 and has a window 64 through which a second set of graduation lines 66 on the member 52 can be observed. A first reference mark in the form of an arrow 68 is provided on the member 62 adjacent the window and a second set of graduation lines 66 on the member 52 can be observed. A first reference mark in the form of an arrow 68 is provided on the member 62 adjacent the window and a second reference mark in the form of an arrow 70 is located diametrically opposite to the arrow 68 adjacent the series of graduation lines 60. Also, a reference mark in the form of an arrow 72 is provided on the member 60. The radial graduation lines in the sets 54 and 60 are equally spaced apart as may be seen in FIG. 5 and the graduation lines in the set 66 are spaced apart by twice the angular distance separating corresponding graduation lines in the other two sets. Consequently, when the arrow 72 points to the graduation line corresponding to the graduation line intercepted by the sight line on the right-hand or passenger side of the vehicle, and the arrow 70 points to the graduation line corresponding to the graduation line intercepted by the sight line on the left-hand or driver's side of the vehicle the arrow 68 will indicate the graduation line which is half way between those two lines.

When using the calculator 50, the alignment technician thus reads the positions on the screens 25 and 26 intercepted by the respective sight lines, rotates the member 56 to one of these positions and then rotates the member 62 to the other of these positions. The position to which the two toe angles are to be adjusted is thus shown by the graduation line to which the arrow 68 points. In the illustrated positions of the members 56 and 72, the initial sight line readings were, as discussed above, at graduation lines 26 and 40. Consequently, the reference arrow 68 points to position 33.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of aligning the front or rear wheels of a vehicle having a pair of front wheels, a pair of rear wheels, and a steering wheel comprising the steps of:

while holding said steering wheel in a centered, straight ahead position, setting the angles of one of said pairs of wheels relative to one another to the desired toe angle settings, mounting graduated screens to the outside of each of the other of said pair of wheels with said screens lying in planes which are substantially perpendicular to the planes of the wheels to which they are mounted, then sighting along each of said one pair of wheels to the respective screens on the same side of the vehicle and determining the relative positions at which the lines of sight are intercepted by said screens, and then adjusting the toe angles of each of said wheels by an angular amount proportional to one-half the difference between said relative positions, whereby said steering wheel will be in a centered, straight ahead position when said vehicle is traveling in a straight ahead direction and said one of said pair of wheels will have the desired toe angle.

2. A method according to claim 1, wherein said lines of sight are substantially parallel to the planes of the respective wheels along which said screens are sighted.

3. A method of aligning according to claim 1 wherein the step of adjusting each of said angles is carried out by totalizing the noted screen positions, and then setting each of said toe angles to one-half the total of said noted screen positions.

4. An instrument for use in measuring and adjusting the toe angles of a first pair of wheels relative to the tracking axis of the vehicle to which said wheels are mounted, said vehicle also having another pair of wheels, comprising first sight means for providing a first sight line, means for mounting said first sight means to one of said first pair of wheels with said first sight line extending in a direction substantially parallel to the plane of said one of said wheels, second-sight means for providing a second sight line, means for mounting said second sight means to the other of said pair of wheels with said second sight line extending in a direction substantially parallel to the plane of said wheels, first and second generally planar screens each having a plurality of horizontally spaced graduation marks, means for mounting said screens to respective ones of said another pair of wheels in substantially perpendicular relationship with the respective planes of said another pair of wheels for intercepting respective ones of said first and second lines, each of said means for mounting comprises an upright support member adapted to be positioned against the wall of a tire mounted on one of said another pair of wheels with the lower end of said upright support member resting on the surface supporting said tire, a cross member carried by said upright member and extending perpendicularly thereto, first and second axially movable members carried by said cross member and adapted to be positioned against the wall of said tire, spring means biasing said movable members toward one another, and laterally extending tread-engaging arms respectively carried by said first and second axially movable members.

* * * * *